United States Patent [19]
Maxson

[11] Patent Number: 5,854,310
[45] Date of Patent: Dec. 29, 1998

[54] CURABLE FLUOROSILICONE COMPOSITION HAVING IMPROVED LUBRICITY

[75] Inventor: Myron T. Maxson, Sanford, Mich.

[73] Assignee: Dow Corning Corporation, Midland, Mich.

[21] Appl. No.: 895,245

[22] Filed: Jul. 21, 1997

[51] Int. Cl.⁶ ...................................................... C08K 9/06
[52] U.S. Cl. .......................... 525/213; 524/462; 524/588; 524/795; 524/838; 524/837
[58] Field of Search .............................. 523/213; 524/462, 524/588, 795, 838, 837

[56] References Cited

U.S. PATENT DOCUMENTS

| | | | |
|---|---|---|---|
| 3,776,934 | 12/1973 | Toporcer et al. | 260/448.2 |
| 4,020,044 | 4/1977 | Crossan et al. | 260/46.5 |
| 4,614,760 | 9/1986 | Homan et al. | 524/860 |
| 4,826,905 | 5/1989 | Itoh et al. | 524/366 |
| 5,171,773 | 12/1992 | Chaffee et al. | 524/493 |
| 5,399,602 | 3/1995 | Matsushita et al. | 524/267 |
| 5,569,698 | 10/1996 | Maxson | 524/493 |

*Primary Examiner*—Margaret Glass
*Attorney, Agent, or Firm*—William F. Boley; Jennifer S. Warren

[57] ABSTRACT

The present invention is a curable fluorosilicone composition having improved lubricity, low compression set, and good resistance to fluids such as automotive fuel without post-curing. The composition comprises (A) poly(trifluoropropyl)methylsiloxane, (B) vinylmethyldi(N-alkylacetamido)silane, (C) reinforcing treated silica, (D) chlorotrifluoroethylene polymer, and (E) vinyl specific organic peroxide catalyst.

17 Claims, No Drawings

CURABLE FLUOROSILICONE COMPOSITION HAVING IMPROVED LUBRICITY

BACKGROUND OF INVENTION

The present invention is a curable fluorosilicone composition having improved lubricity, low compression set, and good resistance to fluids such as automotive fuel without post-curing. Fluorosilicone elastomers are useful because of their wide service temperature range and their resistance to fuels, oils, and many chemical solvents. Typically fluorosilicone elastomers have a cured surface that has a high coefficient of friction. In the assembly of some components such as electrical grommet inserts or electrical connector gasket inserts, a fluorosilicone elastomer with good surface lubricity is desired to allow for faster parts assembly and to reduce rejected parts due to tearing of the elastomer during assembly operations. Another important property for fluorosilicone compositions to have is low compression set. Low compression sets of fluorosilicone elastomers are typically achieved by post-curing.

An approach to increasing surface lubricity of polydimethylsiloxane elastomers has been to add a nonfunctional, non-miscible oil to the composition. After curing, the oil bleeds to the surface of the polydimethylsiloxane elastomer providing lubricity to the surface. However, when such oils have typically been added to fluorosilicone compositions they have adversely effected the compression set and the fluid resistance of the cured composition. Furthermore when attempts have been made to post-cure the fluorosilcone compositions containing such oils to improve compression set, the oils have been volatized or decomposed thus causing the composition to lose the improved lubricity characteristics. The present invention is a fluorosilicone composition which does not require post-cure to have good compression set and which has good lubricity due to the presence of chlorotrifluoroethylene polymer which can migrate to the surface of the cured composition and which does not adversely impact the compression set of the composition. Furthermore, the present composition has low volume swell in some fluids. In addition to these features the fluorosilicone composition of the presence invention when cured has good strength and resiliency and the typical good fuel, solvent, and chemical resistant associated with fluorosilicone elastomers.

Toporcer et al., U.S. Pat. No. 3,776,934, teach methylvinyldi(N-methylacetamido)silane and its manufacture. The amidosilane is taught useful as a chain extender in organosiloxane compositions.

Crossan et al., U.S. Pat. No. 4,020,044, teach mixing vinylmethyldi(N-alkylacetamido)silane and hydroxyl endblocked polydiorganosiloxane and allowing the mixture to react at room temperature to provide a polydiorganosiloxane having increased molecular weight and vinylmethylsiloxane units in the chain. Crossan et al. report that the gums produced can be crosslinked through the use of organic peroxides.

Homan et al., U.S. Pat. No. 4,614,760, teach a one-part silicone elastomer composition prepared by mixing a hydroxyl end-terminated polydiorganosiloxane, a difunctional silane having two amido radicals, and an organic peroxide suitable for vulcanizing silicone rubber. The composition is exposed to moisture to activate a chain extension reaction that increases the molecular weight of the polydiorganosiloxane to improve the physical properties of the cured silicone elastomer.

Chaffee et al., U.S. Pat. No. 5,171,773, teach that a fluorinated polydiorganosiloxane elastomer having improved physical properties can be obtained through the use of a method which first reacts a hydroxyl endblocked poly(fluoropropyl)methylsiloxane having a Williams plasticity number greater than 5.7 mm with a vinylmethyldi(N-alkylacetamido)silane to give a chain-extended polymer having pendant vinyl groups only at the location of the chain extension. Chaffee et al. teach that the chain-extended polymer can be mixed with a fumed silica having a surface area of about 400 $m^2/g$. The resulting compositions can be peroxide cured to form a silicone elastomer.

SUMMARY OF INVENTION

The present invention is a curable fluorosilicone composition having improved lubricity, low compression set, and good resistance to fluids such as automotive fuel without post-curing. The composition comprises
(A) poly(trifluoropropyl)methylsiloxane, (B) vinylmethyldi(N-alkylacetamido)silane, (C) reinforcing treated silica, (D) chlorotrifluoroethylene polymer, and (E) vinyl specific organic peroxide catalyst.

DESCRIPTION OF INVENTION

The present invention is a curable fluorosilicone composition comprising
(A) 100 weight parts of a poly(trifluoropropyl) methylsiloxane composition comprising
  (i) 75 to 95 weight parts of a hydroxyl end-terminated poly(trifluoropropyl)methylsiloxane having a Williams plasticity number within a range of about 100 mm to 400 mm at 25° C. and
  (ii) 5 to 25 weight parts of a hydroxyl end-terminated poly(trifluoropropylmethyl)vinylmethylsiloxane having a Williams plasticity number within a range of about 100 mm to 400 mm at 25° C. and comprising about 0.1 to 2 mole percent vinylmethylsiloxy units,
(B) 0.05 to 10 weight parts of vinylmethyldi(N-alkylacetamido) silane,
(C) 5 to 50 weight parts of reinforcing treated silica,
(D) 1 to 25 weight parts of chlorotrifluoroethylene polymer, and
(E) vinyl specific organic peroxide catalyst in an amount sufficient to effect cure of the composition.

Component (A) of the present composition comprises (A) (i) 75 to 95 weight parts of a hydroxyl end-terminated poly(trifluoropropyl)methylsiloxane have a Williams plasticity number within a range of about 100 mm to 400 mm. In the present specification the term "trifluoropropyl" when referring to a group bonded to a silicon atom refers to the 3,3,3-trifluoropropyl radical. In the present specification all Williams plasticity numbers reported are as determined by ASTM D926-67 at 25° C. and are expressed as sample height times 100. Preferred is when component (A) (i) comprises about 80 to 90 weight parts of component (A). A preferred viscosity for component (A) (i) is a Williams plasticity number within a range of about 250 mm to 350 mm.

Component (A) of the present composition further comprises (A) (ii) 5 to 25 weight parts of a hydroxyl end-terminated poly (trifluoropropylmethyl) vinylmethylsiloxane having a Williams plasticity number within a range of about 100 mm to 400 mm. Component (A) (ii) is a copolymer comprising (3,3,3-trifluoropropyl) methylsiloxy units and vinylmethylsiloxy units, where the vinylmethylsiloxy units typically comprise about 0.1 to 2 mole percent of the siloxy units. In component (A)(ii) it is preferred that about 0.4 to 1 mole percent of the siloxy units be vinylmethylsiloxy units. Preferred is when component (A)(ii) comprises about 10 to 20 weight parts of component (A). A preferred viscosity for component (A)(ii) is a Williams plasticity number within a range of about 250 mm to 350 mm.

The present composition comprises (B) 0.05 to 10 weight parts of vinylmethyldi(N-alkylacetamido)silane per 100 weight parts of component (A). Preferred is when the present composition comprises about 0.5 to 5 weight parts of vinylmethyldi(N-alkylacetamido)silane on the same basis. In the vinylmethyldi(N-alkylacetamido)silane the alkyl group substituted on nitrogen can comprise one to about 4 carbon atoms. The alkyl group substituted on the nitrogen atom of component (B) can be, for example, methyl, ethyl, propyl, and tert-butyl. Preferred is when component (B) is vinylmethyldi(N-methylacetamido)silane. The method of making component (B) is not critical and can be any of those known in the art. Component (B) can be made, for example, by the process described in Toporcer et al., U.S. Pat. No. 3,776,934.

The present composition comprises 5 to 50 weight parts of (C) reinforcing treated silica per 100 weight parts of component (A). Preferred is when the present composition comprises about 15 to 30 weight parts of the reinforcing treated silica on the same basis. The reinforcing treated silica can be, for example, a fumed silica, precipitated silica, or colloidal silica. Preferred is when the reinforcing treated silica is a fumed silica.

In order to provide adequate reinforcing of the present composition, the reinforcing treated silica should have a BET surface area of at least 50 $m^2/g$. Preferred is when the reinforcing silica filler has a BET surface area within a range of about 50 $m^2/g$ to 1000 $m^2/g$. Most preferred is when the reinforcing silica filler has a BET surface area within a range of about 50 $m^2/g$ to 150 $m^2/g$. By the term "reinforcing" it is meant that the silica filler serves to increase physical properties such as tear and tensile strength of the present composition when cured.

By use of the term "treated" it is meant that the reinforcing treated silica is made more hydrophobic by treatment with one or more of the organosilicon compounds known in the art for effecting such treatment. This treatment of the silica can improve the compatibility of the silica with other component of the composition and reduce the phenomena typically referred to as "crepe" which can occur during storage of the compositions. Creping is typically characterized by an increase in viscosity or plasticity of a composition to the extent that processing by convention techniques and equipment become difficult.

The silica treating agents can include, for example, liquid silanol-containing organosilicon compounds and organosilicon compounds such as organodisilazanes which can be hydrolyzed to form these compounds under the conditions used to treat the silica. The hydrolyzable precursors of silanol-containing silica treating agents can include, for example, cyclic polydiorganosiloxanes, silazanes, and linear polydiorganosiloxanes containing alkoxy or other readily hydrolyzable groups. In the present compositions it is preferred that the reinforcing treated silica be treated with an oligomeric hydroxyl end-terminated polytrifluoropropylmethylsiloxane. Even more preferred is when the reinforcing treated silica is treated with an oligomeric hydroxyl end-terminated polytrifluoropropylmethylsiloxane comprising about 3 to 7 (3,3,3-trifluoropropyl)methylsiloxy units per molecule. The presence of the trifluoropropylsiloxy units on the reinforcing treated silica improves the compatibility of the silica with component (A). Even more preferred is when in addition to the oligomeric hydroxyl end-terminated polytrifluoropropylmethylsiloxane treating agent the silica is treated with an oligomeric polysiloxane comprising dimethylsiloxy units and vinylmethylsiloxy units.

The method of treating the reinforcing treated silica with the treating agent or agents is not critical to the present invention and can be any of those known in the art. The reinforcing treated silica can be treated prior to addition to the present composition or may be treated in situ. In a preferred method the reinforcing treated silica is treated in situ. By the term "in situ" it is meant that the treating agent is added to the present composition comprising components (A) through (C), if necessary in the presence of sufficient water to hydrolyze the treating agent, and the composition is heated at a temperature sufficient to effect treatment of the silica. The present composition may then be further heated under reduced pressure to effect removal of volatiles from the composition. When treatment of the silica is effected in situ, the concentration of treating agent added to the process is typically within a range of 1 to 30 percent of the weight of the silica. The temperature at which the in situ treatment of the reinforcing silica is effected can typically be within a range of about 120° C. to 300° C.

The present composition comprises (D) 1 to 25 weight parts of chlorotrifluoroethylene polymer per 100 weight parts of component (A). Preferred is when component (D) comprises about 5 to 10 weight parts of the chlorotrifluoroethylene polymer on the same basis. Component (D) is added to the present composition to provide lubricity to the cured composition by bleeding to the surface. Therefore, to be effective in the present composition component (D) must not react with other components in the present composition and must be of a molecular weight such that it can migrate to the surface of the present composition when cured. The chlorotrifluoroethylene polymer useful in the present composition comprises repeating units of formula —$(CF_2CFCl)_n$— where n is an average number such that the viscosity of the chlorotrifluoroethylene polymer is within a range of about 5 mPa.s to 5000 mPa.s at 25° C. More preferred is when the chlorotrifluoroethylene polymer has a viscosity within a range of about 25 mPa.s to 1000 mPa.s at 25° C. Preferred is when the chlorotrifluoroethylene polymer has a viscosity of about 100 mP.s at 25° C.

The present composition comprises (E) vinyl specific organic peroxide catalyst in an amount sufficient to effect cure of the composition. The vinyl specific organic peroxide catalysts useful in the present composition are well known in the art and include ditertiary butyl peroxide, tertiary butyl perbenzoate, dicumyl peroxide, 2,5-bis(tert-butylperoxy)-2,5-dimethyl hexane, and tert-butylperoxy isopropyl carbonate. A preferred catalyst for use in the present composition is 2,5-bis(tert-butyl peroxy)-2,5-dimethyl hexane. The amount of component (E) added to the present composition is that sufficient to effect cure of the composition to a fluorosilicone elastomer and will depend upon the particular organic peroxide used. General guidance as to appropriate levels of component (E) is provide by the examples herein.

In a preferred composition, the present composition further comprises (F) 1 to 15 weight parts of a hydroxyl end-terminated polydimethylsiloxane comprising about 1 to 10 mole percent pendant vinyl substitution on silicon atoms and having a Williams plasticity number within a range of about 100 mm to 200 mm, per 100 weight parts of component(A). More preferred is when the present composition comprises about 5 to 10 weight part of component (F) and component F comprises about 2 to 7 mole percent pendant vinyl substituted on silicon atoms and has a Williams plasticity number within a range of about 125 mm to 150 mm, on the same basis.

The present compositions may further contain other additives normally used in curable fluorosilicone compositions such as extending fillers, heat stability agents, and pigments as long as such additives to not adversely effect desirable properties of the cured compositions.

In a preferred method for making the present composition, component (A) (i) is placed in a mixer heated to a temperature of about 23° C. to 100° C. and sheared under a stream of dry nitrogen for a period of time sufficient to remove any free water. Component (B) is than added to the mixer while continuing the dry nitrogen sweep and at a temperature below 80° C. for a period of time sufficient to increase the Williams plasticity number of component (A)(i) by chain extension. Component (A)(ii) is added to the mixer and mixing continued until a homogeneous mixture is obtained. After the homogeneous mixture is obtained, a silica treating agent is added and homogeneously blended into the mixer content. Then, component (C), the reinforcing silica, is added to the mixer and while mixing the content of the mixer is heated at a temperature of at least 130° C. under a vacuum of at least 150 mm Hg for a period of time of at least one hour to give a fluorosilicone base composition. To the cooled fluorosilicone base composition is then added components (D) and (E). The curable fluorosilicone compositions comprising the present invention can then be fabricated into commercially useful devices by such methods as molding and be heat cured by standard methods. The cured fluorosilicone compositions have excellent lubricity and compression set without the need for post-curing If desired, the present composition comprising components (A) through (E) and any optional components may be placed into dispersion in an organic solvent such as methylethylketone.

The following examples are provided to illustrate the present invention. These examples are not intended to limit the scope of the claims herein

EXAMPLE 1

A fluorosilicone base was prepared comprising the formulation described in Table 1. To prepare the fluorosilicone base component (A)(i) was added to a mixer and sheared under a dry nitrogen blank at a temperature of 100° C. to remove any free water. To the mixer was then added component (B) and mixing was continued under a dry nitrogen sweep at a temperature of 80° C. until the Williams plasticity number of component (A)(i) increased. Then, component (A)(ii) was added to the mixer and mixing continued until the content of the mixer was homogeneous. To this homogeneous mixture was added components (F), (G), and (H) which were homogeneously mixed into the mixture. Component C was then added to the mixer and the resulting mixture heated at 130° C. under a vacuum of 150 mmHg for one hour to give a fluorosilicone base.

TABLE 1

Fluorosilicone Base Formulation

| | wt. Parts | Component Description |
|---|---|---|
| (A) (i) | 81.6 | Hydroxyl end-terminated poly(trifluoropropyl)methylsiloxane having a Williams plasticity number of about 290 mm. |
| (A) (ii) | 18.4 | Hydroxyl end-terminated poly(trifluoropropyl)vinylmethylsiloxane having a Williams plasticity number of about 280 mm and comprising 0.6 mole percent vinylmethylsiloxy units. |
| (B) | 0.3 | Vinylmethyldi(N-methylacetamido)silane. |
| (C) | 25.5 | Fumed silica, Cabosil L-90, BET surface area 94 m$^2$/g. |
| (F) | 2.0 | Hydroxyl end-terminated poly (vinylmethyl) dimethylsiloxane having a Williams plasticity number of about 127 mm and comprising 3.8 mole percent vinylmethylsiloxy units. |
| (G) | 5.1 | Hydroxyl end-terminated poly(trifluoropropyl)methylsiloxane having a viscosity of 100 mPa · s at 25° C. |
| (H) | 1.0 | Hydroxyl end-terminated poly(vinylmethyl)dimethylsiloxane having a viscosity of 40 mPa · s at 25° C. and comprising 10 weight percent vinyl. |

Into the fluorosilicone base prepared as described above was added 0.6 weight parts of 2,5-bis(tert-butyl peroxyl)-2, 5,dimethyl hexane. Various fluids were added to portions of this catalyzed base composition of the types and at the levels described in Table 2. Also added was 0.5 weight parts cerium hydrate, as a heat stabilizer, per 100 parts of the fluorosilicone base. The catalyzed base compositions containing the fluids described in Table 2 were press cured at 171° C. for 10 minutes.

The physical properties of the cured samples were determined by the following test methods: shore A durometer (Durometer A) ASTM D2240, tear (die B) ASTM D624, Compression set (22 h/177° C.) ASTM D395, and tensile, elongation, and modulus (100%) by ASTM D412. Volume swell was determined by ASTM D471. The results of the physical properties testing are provided in Table 2. The presence of "Surface Oil" was observed visually and reported as an indication of lubricity of the compositions.

TABLE 2

Type Fluids and Physical Properties Test Results

| Component | Weight Parts | | | |
|---|---|---|---|---|
| Base | 100 | 100 | 100 | 100 |
| DC 200 Fluid[1] | — | 5 | — | — |
| DC 702 Fluid[2] | — | — | 5 | — |
| Halocarbon 95[3] | — | — | — | 5 |
| | Physical Properties | | | |
| Durometer A | 37 | 31 | 27 | 27 |
| Tensile (Mpa) | 8.052 | 7.273 | 8.707 | 9.272 |
| 50% Modulus (MPa) | 0.751 | 0.585 | 0.572 | 0.510 |
| 100% Modulus (Mpa) | 1.668 | 1.310 | 1.206 | 1.034 |
| Elongation (%) | 281 | 293 | 355 | 394 |
| Tear B (kN/m) | 12.425 | 10.325 | 13.125 | 17.500 |
| Comp. Set (%) | 12.2 | 7.1 | 9.9 | 11.2 |
| Vol. Swell RFB (%) | 22.2 | 40.2 | 35.8 | 22.7 |
| Surface Oil | no | slight | yes | yes |

TABLE 2-continued

Type Fluids and Physical Properties Test Results

Component

[1] Polydimethylsiloxane, Visc. 200 cs at 25° C., Dow Corning Corporation, Midland, MI.
[2] Polyphenylmethylsiloxane, Visc. 50 cs at 25° C., Dow Corning Corporation, Midland, MI.
[3] Polychlorotrifluoroethylene, Visc. 250 at 25° C., Halocarbon Products Corporation, River Edge, NJ.

EXAMPLE 2

A fluorosilicone base was prepared by a method similar to that described in Example 1. The composition of the fluorosilicone base is described in Table 3. The fluorosilicone base was catalyzed as described in Example 1 and various fluids where added at the concentrations as described in Table 4a and 4b. The resulting compositions where cured and evaluated by the test methods described in Example 1 and the results are described in Tables 4a and 4b.

TABLE 3

Fluorosilicone Base Formulation

| | Wt. Parts | Component Description |
|---|---|---|
| (A) (i) | 81.3 | Hydroxyl end-terminated poly(trifluoropropyl)methylsiloxane having a Williams plasticity number of about 290 mm. |
| (A) (ii) | 18.3 | Hydroxyl end-terminated poly(trifluoropropyl)vinylmethylsiloxane having a Williams plasticity number of about 280 mm and comprising 0.6 mole percent vinylmethylsiloxy units. |
| (B) | 0.6 | vinylmethyldi(N-methylacetamido)silane. |
| (C) (i) | 14.6 | Fumed silica, Cabosil L-90, BET surface area 94 m2/g. |
| (C) (ii) | 16.3 | Fumed silica, Cabosil MS-7, BET surface area 150 m2/g. |
| (F) | 2.0 | Hydroxyl end-terminated poly(vinylmethyl)dimethylsiloxane having a Williams plasticity number of about 127 mm and comprising 3.8 mole percent vinylmethylsiloxy units. |
| (G) | 5.8 | Hydroxyl end-terminated poly(trifluoropropyl)methylsiloxane having a viscosity of 100 mPa · s at 25° C. |
| (H) | 0.7 | Hydroxy end-terminated poly(vinylmethyl)dimethylsiloxane having a viscosity of 40 mPa · s at 25° C. and comprising 10 weight percent vinyl. |
| (I) | 0.4 | 1,3-Divinyltetramethyldisilazane. |

TABLE 4a

Type Fluids and Physical Properties Test Results

| Component | Weight Parts | | | |
|---|---|---|---|---|
| Base | 100 | 100 | 100 | 100 |
| DC 200 Fluid[1] | — | 5 | 7.5 | 10 |
| | Physical Properties | | | |
| Durometer A | 45 | 44 | 44 | 46 |
| Tensile (MPa) | 8.920 | 7.731 | 7.784 | 7.028 |
| 50% Modulus (MPa) | 0.723 | 0.724 | 0.786 | 0.800 |
| 100% Modulus (MPa) | 1.503 | 1.317 | 1.372 | 1.414 |
| Elongation (%) | 345 | 360 | 365 | 333 |
| Tear B (kN/m) | 16.98 | 15.13 | 12.31 | 11.78 |
| Comp. Set % | 17.5 | 17.5 | 23.2 | 22.3 |
| Vol. Swell RFB (%) | 17.1 | 35.1 | 34.8 | 46.6 |
| Surface Oil | no | yes | yes | yes |

[1] Polydimethylsiloxane, Visc. 200 cs at 25° C., Dow Corning Corporation, Midland, MI.

TABLE 4b

Type Fluids and Physical Properties Test Results

| Component | Weight Parts | | | | | |
|---|---|---|---|---|---|---|
| Base | 100 | 100 | 100 | 100 | 100 | 100 |
| Halocarbon 95[1] | 5 | 7.5 | 10 | — | — | — |
| Halocarbon 1000N[2] | — | — | — | 5 | 7.5 | 10 |
| | Physical Properties | | | | | |
| Durometer A | 34 | 32 | 32 | 34 | 34 | 33 |
| Tensile (MPa) | 8.924 | 9.462 | 9.400 | 9.062 | 8.028 | 8.586 |
| 50% Modulus (MPa) | 0.510 | 0.496 | 0.496 | 0.579 | 0.531 | 0.524 |
| 100% Modulus (MPa) | 0.855 | 0.834 | 0.855 | 1.034 | 0.924 | 0.896 |
| Elongation (%) | 479 | 481 | 470 | 442 | 409 | 444 |
| Tear B (kN/m) | 20.41 | 21.46 | 21.99 | 18.47 | 22.17 | 18.53 |
| Comp. Set (%) | 26.1 | 27.2 | —[3] | —[3] | 15.4 | 17.8 |
| Vol. Swell RFB (%) | 17.2 | 18.0 | 19.6 | 20.8 | 25.1 | 27.4 |
| Surface Oil | yes | yes | yes | yes | yes | yes |

[1] Polychlorotrifluoroethylene, Visc. 250 cs at 25° C., Halocarbon Products Corporation, River Edge, NJ.
[2] Polychlorotrifluoroethylene, Visc. 4000 cs at 25° C., Halocarbon Products Corporation.
[3] Sample to oily to test.

I claim:

1. A curable fluorosilicone composition comprising
    (A) 100 weight parts of a poly(trifluoropropyl) methylsiloxane composition comprising
        (i) 80 to 95 percent of a hydroxyl en-terminated poly (trifluoropropyl)methylsiloxane having a Williams plasticity number within a range of about 100 mm to 400 mm and
        (ii) 5 to 20 weight parts of a hydroxyl end-terminated poly(trifluoropropyl)vinylmethylsiloxane having a Williams plasticity number within a range of about 100 mm to 400 mm and comprising about 0.1 to 2 mole percent vinylmethylsiloxy units,
    (B) 0.05 to 10 weight parts of vinylmethyldi(N-alkylacetamido)silane,
    (C) 5 to 50 weight parts of reinforcing treated silica,
    (D) 1 to 25 weight parts of chlorotrifluoroethylene polymer, and
    (E) vinyl specific organic catalyst in an amount sufficient to cure the composition, wherein the weight parts of components (B), (C), (D), and (E) are based on 100 weight parts of component (A).

2. A curable fluorosilicone composition according to claim 1, where component (A)(i) comprises about 80 to 90 weight parts per 100 weight parts of component (A) and component (A)(i) has a Williams plasticity number within a range of about 250 mm to 350 mm.

3. A curable fluorosilicone composition according to claim 1, where component (A)(ii) comprises about 0.4 to 1 mole percent vinylmethylsiloxy units.

4. A curable fluorosilicone composition according to claim 1 comprising 0.5 to 5 weight parts of the vinylmethyldi(N-alkylacetamido)silane per 100 weight parts of component (A).

5. A curable fluorosilicone composition according to claim 1, where component (B) is vinylmethyldi(N-methylacetamido)silane.

6. A curable fluorosilicone composition according to claim 1 comprising about 15 to 30 weight parts of the reinforcing treated silica.

7. A curable fluorosilicone composition according to claim 1, where the reinforcing treated silica has a surface area within a range of about 50 $m^2/g$ to 1000 $m^2/g$.

8. A curable fluorosilicone composition according to claim 1, where the reinforcing treated silica has a surface area within a range of about 50 $m^2/g$ to 150 $m^2/g$.

9. A curable fluorosilicone composition according to claim 1, where the reinforcing treated silica is treated with an oligomeric hydroxyl end-terminated polytrifluoropropylmethylsiloxane comprising about 3 to 7 (3,3,3-trifluoropropyl)methylsiloxy units per molecule.

10. A curable fluorosilicone composition according to claim 9, where the reinforcing treated silica is further treated with an oligomeric polysiloxane comprising dimethylsiloxy units and vinylmethylsiloxy units.

11. A curable fluorosilicone composition according to claim 1 comprising 5 to 10 weight parts of the chlorotrifluoroethylene polymer per 100 weight parts of component (A).

12. A curable fluorosilicone composition according to claim 1, where the chlorotrifluoroethylene polymer has a viscosity within a range of about 5 mPa.s to 5000 mPa.s at 25° C.

13. A curable fluorosilicone composition according to claim 1, where the chlorotrifluoroethylene polymer has a viscosity within a range of about 25 mPa.s to 1000 mPa.s at 25° C.

14. A curable fluorosilicone composition according to claim 1, where component (E) is 2,5-bis(tert-butyl peroxyl)-2,5-dimethyl hexane.

15. A curable fluorosilicone composition according to claim 1 further comprising (F) 1 to 15 weight parts of a hydroxyl end-terminated polydimethylsiloxane comprising about 1 to 10 mole percent pendant vinyl substitution on silicon atoms and having a Williams plasticity number within a range of about 100 mm to 200 mm, per 100 parts of component (A).

16. A curable fluorosilicone composition according to claim 1, where the composition is dispersed in an organic solvent.

17. A curable fluorosilicone composition according to claim 16, where the organic solvent is methylethylketone.

* * * * *